United States Patent
Davidovich et al.

(10) Patent No.: US 10,817,576 B1
(45) Date of Patent: Oct. 27, 2020

(54) SYSTEMS AND METHODS FOR SEARCHING AN UNSTRUCTURED DATASET WITH A QUERY

(71) Applicant: SparkBeyond Ltd., Natania (IL)

(72) Inventors: Sagie Davidovich, Zikhron-Yaakov (IL); Denis Wainshtein, Shlomy (IL); Meir Maor, Netanya (IL); Amir Ronen, Haifa (IL); Yuval Peleg, Tel Aviv (IL); Ron Karidi, Herzliya (IL)

(73) Assignee: SparkBeyond Ltd., Natanya (IL)

( * ) Notice: Subject to any disclaimer, the term of this patent is extended or adjusted under 35 U.S.C. 154(b) by 0 days.

(21) Appl. No.: 16/533,814

(22) Filed: Aug. 7, 2019

(51) Int. Cl.
 *G06F 16/953* (2019.01)
 *G06F 16/35* (2019.01)
 *G06F 3/0484* (2013.01)
 *G06N 20/00* (2019.01)

(52) U.S. Cl.
 CPC .......... *G06F 16/953* (2019.01); *G06F 3/0484* (2013.01); *G06F 16/353* (2019.01); *G06N 20/00* (2019.01)

(58) Field of Classification Search
 None
 See application file for complete search history.

(56) References Cited

U.S. PATENT DOCUMENTS

| | | | | |
|---|---|---|---|---|
| 4,752,889 A | * | 6/1988 | Rappaport | G06N 5/022 706/11 |
| 7,299,228 B2 | * | 11/2007 | Cao | G06F 16/30 |
| 7,412,385 B2 | * | 8/2008 | Brockett | G06F 40/44 704/245 |
| 8,155,946 B2 | * | 4/2012 | Hudson | G06F 16/3344 704/4 |
| 2003/0101024 A1 | * | 5/2003 | Adar | G06Q 30/02 702/187 |
| 2004/0019588 A1 | * | 1/2004 | Doganata | G06F 16/3338 |
| 2006/0248093 A1 | * | 11/2006 | Lassila | G06F 16/951 |
| 2009/0012842 A1 | * | 1/2009 | Srinivasan | G06F 16/3344 705/12 |
| 2009/0070322 A1 | * | 3/2009 | Salvetti | G06F 16/3334 |

OTHER PUBLICATIONS

Lin et al., DIRT—discovery of inference rules from text Aug. 29, 2001, Proceedings of the seventh ACM SIGKDD international conference on Knowledge discovery and data mining, pp. 323-28.*
Voorhees et al., The TREC-8 Question Answering Track Evaluation Nov. 19, 1999, NIST, NIST Special Publication 500-246: The Eighth Text REtrieval Conference (TREC 8), pp. 83-106.*

* cited by examiner

*Primary Examiner* — Jason G Liao

(57) ABSTRACT

There is provided a method for searching an unstructured dataset with a query, comprising: receiving a query comprising a value for a first token of a triplet, and a value for a relation term defining a relationship between the first token and a second token of the triplet, wherein the second token is defined as a variable element set with an undefined value, creating a plurality of enhanced queries for the query, each one of the plurality of enhanced queries including variations of the relation term, providing the plurality of enhanced queries for search by a search engine on at least one dataset of unstructured text-based data, receiving a plurality of documents in response to the search, analyzing the plurality of documents for extracting at least one value for the variable element of the triplet, and providing the at least one value for the variable element.

18 Claims, 6 Drawing Sheets

SYSTEMS AND METHODS FOR SEARCHING AN UNSTRUCTURED DATASET WITH A QUERY

BACKGROUND

The present invention, in some embodiments thereof, relates to search engines and, more specifically, but not exclusively, to query process for searching by a search engine.

Search engines search large datasets based on a received query. The query contains key words, which are matched to different network documents. The retrieved network documents are presented to a user. The user examines the search results to identify the network document(s) which are most relevant. For example, a user enters key words into a search engine. The search engine retrieves web sites that best fit the key words of the query.

SUMMARY

According to a first aspect, a method for searching an unstructured dataset with a query, comprises: receiving a query comprising a value for a first token of a triplet, and a value for a relation term defining a relationship between the first token and a second token of the triplet, wherein the second token is defined as a variable element set with an undefined value, creating a plurality of enhanced queries for the query, each one of the plurality of enhanced queries including variations of the relation term, providing the plurality of enhanced queries for search by a search engine on at least one dataset of unstructured text-based data, receiving a plurality of documents in response to the search, analyzing the plurality of documents for extracting at least one value for the variable element of the triplet, and providing the at least one value for the variable element.

According to a second aspect, a system for searching an unstructured dataset with a query, comprises: at least one hardware processor executing a code for: receiving a query comprising a value for a first token of a triplet, and a value for a relation term defining a relationship between the first token and a second token of the triplet, wherein the second token is defined as a variable element set with an undefined value, creating a plurality of enhanced queries for the query, each one of the plurality of enhanced queries including variations of the relation term, providing the plurality of enhanced queries for search by a search engine on at least one dataset of unstructured text-based data, receiving a plurality of documents in response to the search, analyzing the plurality of documents for extracting at least one value for the variable element of the triplet, and providing the at least one value for the variable element.

According to a third aspect, a method for searching an unstructured dataset with a query, comprises: receiving a query comprising a value for a first token of a triplet, and a value for a second token of the triplet, the triplet further including a relation term defining a relationship between the first token and the second token, wherein the relation term is defined as a variable element set with an undefined value, providing the query for search by a search engine on at least one dataset of unstructured text-based data, receiving a plurality of documents in response to the search, analyzing the plurality of documents for extracting at least one value for the variable element of the triplet, and providing the at least one value for the variable element.

In a further implementation of the first, second, and third aspects, the query comprise a plurality of nested triplets, wherein the variable element with undefined value of a lower level nested triplet is mapped to an element of a higher level triplet, the higher level triplet including the mapped element, and a higher level relation term defining a relationship between the mapped element and a higher level second token defined as a higher level variable element with undefined value.

In a further implementation of the first, second, and third aspects, the nested triplets are recursively processed, by creating a higher level query by setting the mapped element of the higher level triplet according to the at least one value for the lower level triplet, and setting the relation term of the higher level query according to the higher level relation term, and wherein the creating the plurality of enhanced queries, the providing the plurality of enhanced queries, the receiving the plurality of documents, and the analyzing the plurality of documents to extract at least one value are performed for the higher level query.

In a further implementation of the first, second, and third aspects, the plurality of enhanced queries for the higher level triplet are enriched with context related data extracted according to an analysis of the plurality of documents received in response to a search of the plurality of enhanced queries generated for the lower level triplet. In a further implementation of the first, second, and third aspects, the plurality of enhanced queries are generated for the query by selecting a plurality of query templates according to the relation, wherein respective relations of the selected query templates are synonyms of the relation of the query.

In a further implementation of the first, second, and third aspects, analyzing the plurality of documents for extracting at least one value for the variable element of the triplet comprises: identifying at least one triplet having three elements in the plurality of documents, and comparing values of three elements of the extracted at least one triplet to the values of the two elements of the query to identify a remaining element, wherein the at least one value for the variable element of the query is set according to the remaining element.

In a further implementation of the first, second, and third aspects, the at least one triplet of the plurality of documents is identified by parsing each text segment of the plurality of documents into a respective dependency tree, and identifying a predefined pattern within the respective dependency tree indicative of a triplet.

In a further implementation of the first, second, and third aspects, the at least one triplet of the plurality of documents is outputted by a trained classifier that is fed the plurality of documents, wherein the classifier is trained on a training dataset of a plurality of training documents labeled with triplets.

In a further implementation of the first, second, and third aspects, the plurality of documents are analyzed for extracting at least one value for the variable element of the query by a question answering model that receives each of the plurality of documents and a question created by a semantic analysis of the query and outputs an indication of the at least one value for the variable elements within the plurality of documents as an answer to the question.

In a further implementation of the first, second, and third aspects, analyzing comprises analyzing the plurality of documents for extracting a plurality of values for the variable element of the query, and further comprising: aggregating the plurality of values for the variable element into a set of values for the variable element, wherein the set of values for the variable element are provided.

In a further implementation of the first, second, and third aspects, the plurality of values are aggregated by clustering similar values, each cluster denoting one value of the set of values.

In a further implementation of the first, second, and third aspects, each respective value of the set of values is assigned a score according to at least one of: a number of documents from which the respective value is extracted, and according to an indication of reliability of the documents from which the respective value is extracted, wherein values of the set of values having scores above a threshold are provided.

In a further implementation of the first, second, and third aspects, each one of the three elements of the query and each of the at least one value for the variable element is a single word or single phrase.

In a further implementation of the first, second, and third aspects, the extracted at least one value for the variable element is associated with a confidence score indicative of correlation to the query, and values for the variable element having confidence score above a threshold are provided.

In a further implementation of the first, second, and third aspects, the relation is selected from the group consisting of: caused by, causes, is part of, alternative to, is used by, is using, deficiency of, positively effects, influences, desired property for, distinguishing property, generalization, happens during, has acquired, has deficiency, has desired property, has expert, has market size, has producer, has properties, has quotes, human intelligence solution, and increased by.

In a further implementation of the first, second, and third aspects, further comprising providing, for each respective value for the variable element, a link to the analyzed document used to provide the respective value.

In a further implementation of the first, second, and third aspects, further comprising: presenting, within a graphical user interface (GUI), a dependency tree graph representation of the triplet with the at least one value for the variable element, wherein the first token is represented as a node of the graph and a root of the tree, wherein a plurality of second tokens are represented as nodes of the graph and leaves of the tree, wherein a plurality of the relation term based on the plurality of enhanced queries are represented as edges connecting nodes and branches connecting the root to the leaves.

In a further implementation of the first, second, and third aspects, further comprising receiving via the GUI a selection of one of the plurality of second tokens and another relation term, creating another query by designating the selected one of the plurality of second tokens as the first token of the another query and designating the another relation term as the relation term of the another query, and presenting within the GUI a plurality of values for the plurality of second tokens as additional nodes of the graph, and representing the plurality of the another relation term as edges connecting the additional nodes to the node of the selected one of the plurality of second tokens.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
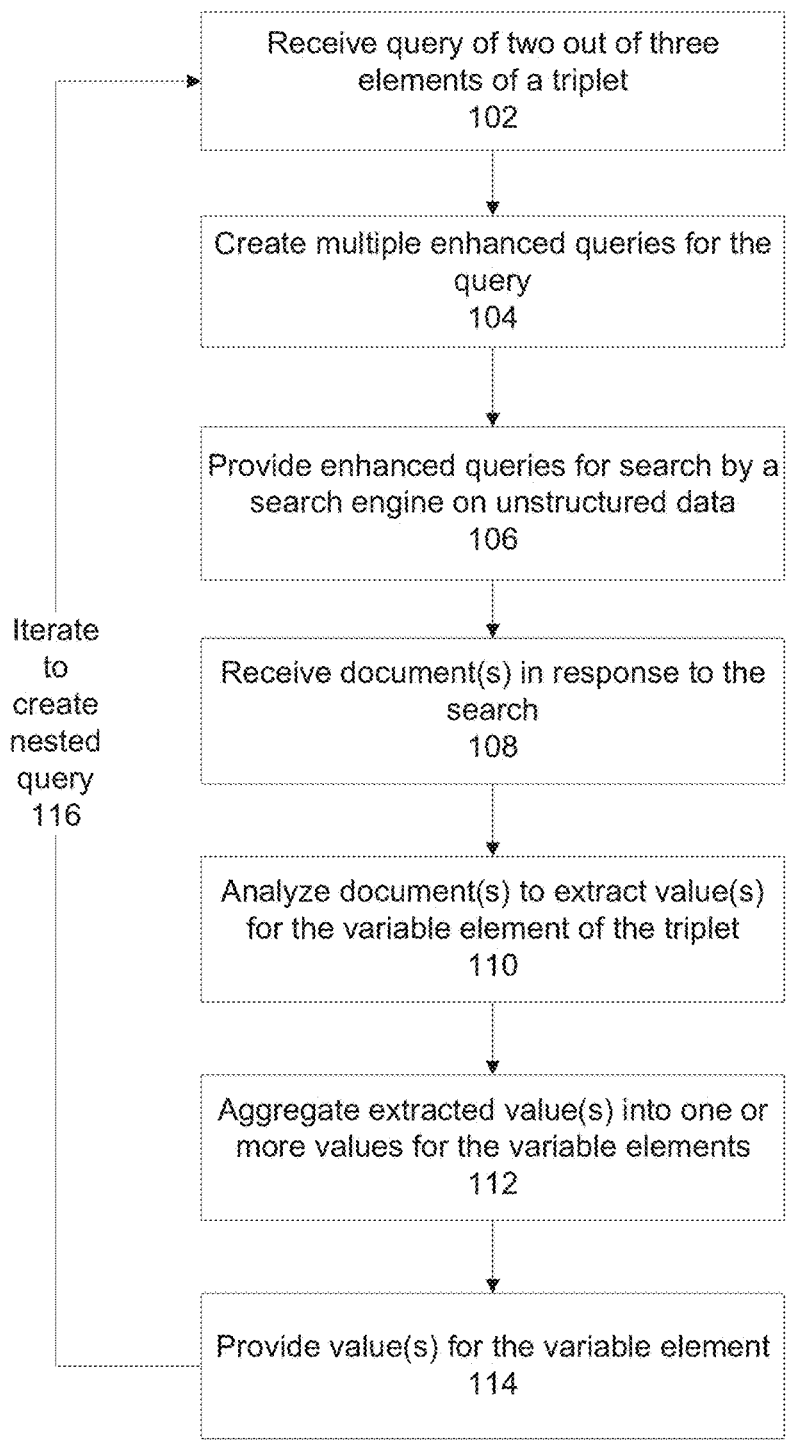
FIG. 1 is a flowchart of a method of searching an unstructured dataset with a query, in accordance with some embodiments of the present invention.

The present invention, in some embodiments thereof, relates to search engines and, more specifically, but not exclusively, to query process for searching by a search engine.

An aspect of some embodiments of the present invention relates to systems, methods, an apparatus, and/or code instructions for searching an unstructured dataset with a query. The search is performed to identify a relationship between concepts, for example, how one concept is related to another concept (e.g., bromine [relationship] car), which certain concept is caused by another concept (fatigue leads to [concept], and what other concept does a certain concept lead to ([concept] causes dry eyes). The concepts are defined using natural language terms, words, and/or phrases, referred to herein as elements and/or tokens. The query for searching includes values for two out of three elements of the triplet, for example, one token and a relation term to identify the second token, or two tokens to identify the relation term. The remaining element for which no specific value is provided in the query is set as a variable element (e.g., set with an undefined value). The three elements of the triplet define: (first token, relation term, second token), where the relation term defines a relationship between the first token and the second token. Multiple enhanced queries are created for the single received query, where each enhanced query includes a variation of the relation term, for example, synonyms thereof. The enhanced queries are provided to a search engine for searching on a dataset of unstructured text-based (i.e., natural language) data, for example, news articles, scientific research publications, and blog entries. Multiple documents are retrieved by the search engine that searches using the enhanced queries. The documents are analyzed to extract one or more values for the variable element of the triplet. The extracted value(s) for the variable element are provided, for example, to the client terminal that provided the query, for example, presented as a graph in a graphical user interface (GUI).

Two different types of searches may be performed using the query. In one type, the relation term and one value of a token are provided in the query. One or more values for the second token are found, where the relation term between the first and second tokens holds, and/or the relation term between the second and first tokens holds. For example, in terms of mathematical representation, the relation term is denoted r, the first token is denoted e1, the second term is denoted e2, and the triplet is denoted as r(e1,e2) and/or r(e2,e1) and/or (e1,r,e2) and/or (e2,r,e1). For example, when the relation term is "causes", and the first token is "traffic accidents", the outputs of the systems and/or methods and/or apparatus and/or code instructions described herein is the set of possible known causes of traffic accidents, for example, one results computed for the second token (i.e., variable element) is "drunk driving". In a second type, values for the first and second tokens are provided in the query. The relationship term between the first and second token is outputted as a result. For example, the relationship between "traffic accidents" and "alcohol abuse".

At least some of the systems, methods, apparatus, and/or code instructions described herein address the technical problem of searching unstructured data, for example, web pages and/or other network documents stored on different web sites on the internet. Using standard approaches, a user enters a query, in the form of one or more key words, into an internet search engine. The internet search engine searches the internet to find web pages that match the key word(s). Matching web sites are presented for manual review by the user. When many web sites are found (as is usually the case), the user needs to manually review the web pages to find the information the user is looking for.

At least some of the systems, methods, apparatus, and/or code instructions described herein improve the technology of search engines that search unstructured data, for example, internet search engines that search web pages using text key words entered by a user. A standard search engine may be used, with an overlay of code that sends enhanced queries to the search engine and processes the results to obtain the triplets, as described herein. The code described herein enhances the search ability of the standard search engine, without necessarily requiring modification to the standard search engine. The improvement to the technology of the search engine is in the ability to search for relationships between elements of a triplet (e.g., concepts), in contrast to standard search engines that match query terms to terms in documents, and retrieve the closest matching document. The improvement is that the search is not performed to identify specific documents, but is performed to identify a missing element of a triplet defining a relationship between two elements. For example, the search is performed for a cause for dry eyes. In another example, the search is performed for uses for bromine compounds.

At least some of the systems, methods, apparatus, and/or code instructions described herein improve the technology of GUIs, by providing an interactive GUI that graphically depicts the results of the query including the triplet. The GUI presents a dependency tree graph representation of the triplet. The first token is represented as a node of the graph (optionally a root of the tree). The multiple second tokens, which are found as described herein by searching the query, are represented as nodes of the graph (optionally as leaves of the tree). The multiple variations of the relation term (i.e., used in the enhanced queries) are represented as edges connecting the nodes (optionally as branches connecting the root to the leaves). The user may select one of the second tokens (e.g., by clicking on the respective node in the GUI) and provide another relation term. The second token and the other relation term are used to generate a new query (also referred to herein as a higher level query), where the selected token is set as a first token of the higher level query, and the another relation term is set as the relation term of the higher level query. The higher level query is executed as described herein to obtain multiple values for the second token of the higher level query. The GUI presents the expanded dependency tree graph, where the multiple second tokens of the higher level query are each represented as nodes connected by respective edges each representing the higher level relation term to the selected node representing the user selected token. The user may iteratively select additional tokens and relation terms to which are used to create and execute additional queries and present additional nodes and edges of the dependency tree graph in the GUI.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
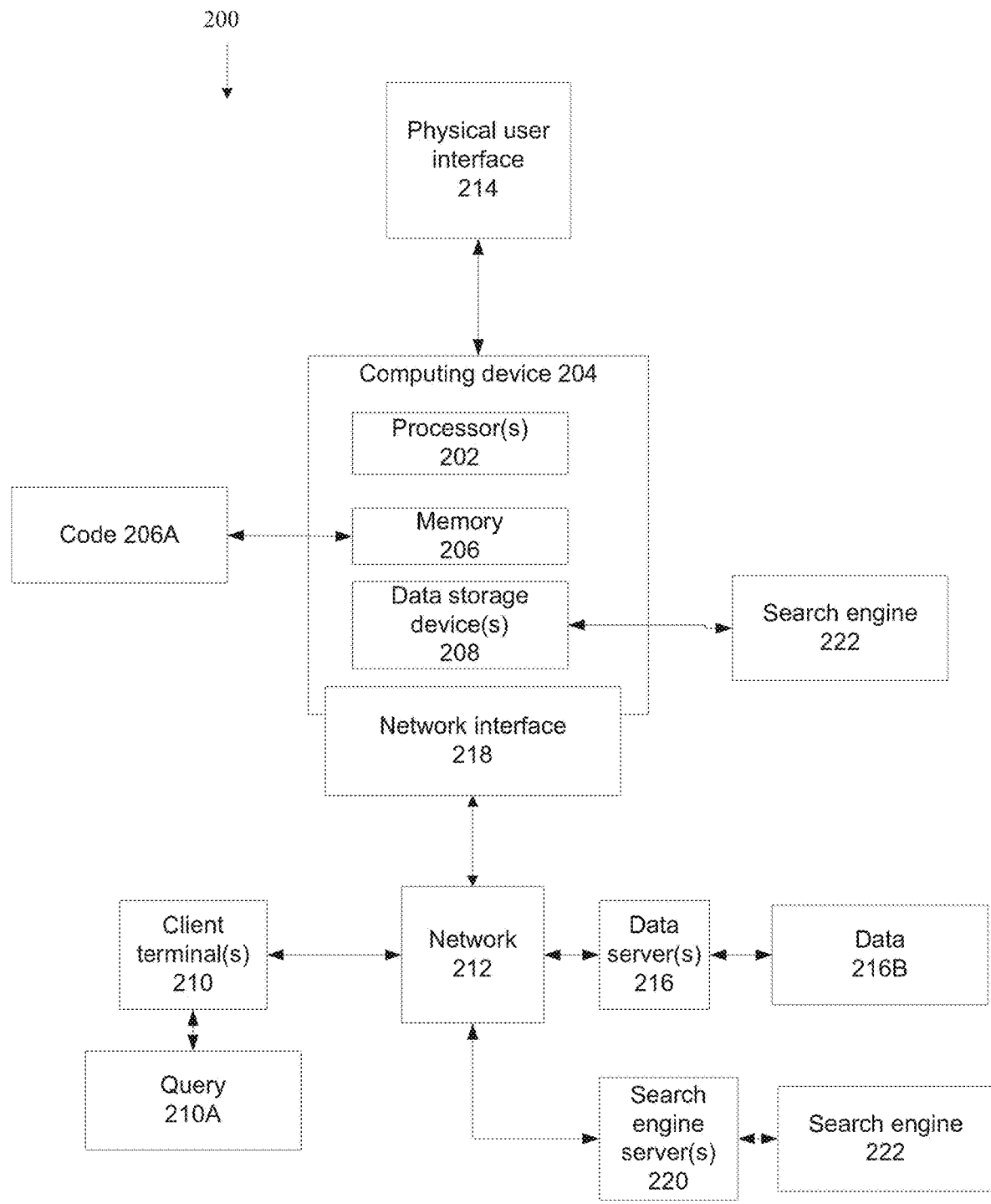
FIG. 2 is a block diagram of components of a system for searching an unstructured dataset with a query, in accordance with some embodiments of the present invention.

Reference is now made to FIG. 1, which is a flowchart of a method of searching an unstructured dataset with a query, in accordance with some embodiments of the present invention. Reference is also made to FIG. 2, which is a block diagram of components of a system 200 for searching an unstructured dataset with a query, in accordance with some embodiments of the present invention. System 200 may implement the acts of the method described with reference to FIG. 1, by processor(s) 202 of a computing device 204 executing code instructions (e.g., code 206A) stored in a memory 206 (also referred to as a program store).

Computing device 204 may be implemented as, for example one or more and/or combination of: a group of connected devices, a client terminal, a server, a search engine server, a virtual server, a computing cloud, a virtual machine, a desktop computer, a thin client, a network node, a network server, and/or a mobile device (e.g., a Smartphone, a Tablet computer, a laptop computer, a wearable computer, glasses computer, and a watch computer).

Different architectures of system 200 may be implemented. For example:

Computing device 204 may be implemented as one or more servers (e.g., network server, web server, a computing cloud, a virtual server, a network node) that provides services to multiple client terminals 210 over a network 212, for example, enhanced searching of queries, as described herein.

Computing device 204 may receive query 210A from each client terminal 210, process query 210A to generate multiple enhanced queries, feed the enhanced queries to a search engine 222 hosted by computing device 204 for searching data 216B stored on network server(s) 216. Computing device 204 provides the results to the respective client terminal 210.

Computing device 204 may interface with a search engine server(s) 220 that executes search engine 222. For example, search engine server(s) 220 receives a query 210A from client terminal 210. Query 210A is provided to computing device 204 for generating multiple enhanced queries. The multiple enhanced queries are fed back to search engine 222 of search engine server(s) 220 for searching data 216B stored by data server(s) 216.

Communication between client terminal(s) 210 and/or search engine server(s) 220 and/or computing device 204 over network 212 may be implemented, for example, via an application programming interface (API), software development kit (SDK), functions and/or libraries and/or add-ons added to existing applications executing on client terminal(s) 210, an application for download and execution on client terminal 210 and/or search engine server 220 that communicates with computing device 204, function and/or interface calls to code executed by computing device 204, a remote access session executing on a web site hosted by computing device 204 accessed via a web browser executing on client terminal(s) 210 and/or search engine server 220.

Computing device 204 may be implemented as a stand-alone device (e.g., client terminal, smartphone, computing cloud, virtual machine, kiosk, server) that includes locally stored code that implement one or more of the acts described with reference to FIG. 2. For example, query 210A is processed to generate multiple enhanced queries which are fed into a locally stored search engine that searches data stored on data servers and/or data locally stored by the computing device.

Data 216B may be unstructured data, for example, text-based. Data 216B may include, for example, web pages, files, records, documents, videos (associated with searchable text) and/or images (associated with searchable text). Data server(s) 216 may include network connected devices that stored data 216B, for example, servers that host web sites.

Search engine 222 may include a standard search engine designed to search data 216B, for example, search web pages and/or other network documents on the internet.

Hardware processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include a single processor, or multiple processors (homogenous or heterogeneous) arranged for parallel processing, as clusters and/or as one or more multi core processing devices.

Memory 206 stores code instructions executable by hardware processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 206 stores code 206A that implements one or more features and/or acts of the method described with reference to FIG. 1 when executed by hardware processor(s) 202.

Computing device 204 may include data storage device(s) 208 for storing data, for example, search engine 222. Data storage device(s) 208 may be implemented as, for example, a memory, a local hard-drive, virtual storage, a removable storage unit, an optical disk, a storage device, and/or as a remote server and/or computing cloud (e.g., accessed using a network connection).

Network 212 may be implemented as, for example, the internet, a broadcast network, a local area network, a virtual network, a wireless network, a cellular network, a local bus, a point to point link (e.g., wired), and/or combinations of the aforementioned.

Computing device 204 may include a network interface 218 for connecting to network 212, for example, one or more of, a network interface card, an antenna, a wireless interface to connect to a wireless network, a physical interface for connecting to a cable for network connectivity, a virtual interface implemented in software, network communication software providing higher layers of network connectivity, and/or other implementations.

Computing device 204 and/or client terminal(s) 210 include and/or are in communication with one or more physical user interfaces 214 that include a mechanism for user interaction, for example, to enter data (e.g., enter the query) and/or to view data (e.g., the retrieved documents obtained from executing the query).

Exemplary physical user interfaces 214 include, for example, one or more of, a touchscreen, a display, gesture activation devices, a keyboard, a mouse, and voice activated software using speakers and microphone.

Client terminal(s) 210 and/or server(s) 216 may be implemented as, for example, as a desktop computer, a server, a virtual server, a network server, a web server, a virtual machine, a thin client, a cellular telephone, a smart phone, and a mobile device.

Referring now back to FIG. 1, at 102, a query is received, for example, from a client terminal. The query may be provided, for example, based on manually user entry, and/or automatically generated by an executing process.

The query includes values for two out of three elements of a triplet, where the element that is not assigned a value (e.g., set with an undefined value) serves as a variable element. The triplet may be represented as (first token, relation term, second token), where the relation term defines a relationship between the first token and the second token. The first token, the relation term, and the second token are natural language terms and/or phrases, optionally each being a single word or single phrase.

Examples of triplets include ("Alcohol abuse", "causes", "Traffic accidents"), where "Alcohol abuse" is the first token, "causes" is the relation term, and "Traffic accidents" is the second token. Another example of a triplet is ("door", "is part of", "house"), where "door" is the first token, "is part of" is the relation term, and "door" is the second token. One of the elements of the triplet is missing when the example triplet is provided as a query.

The values of elements of the triplet of the query may be inputted using one or more methods, for example, the user may manually type the entire triplet, using a special defined notation for the variable elements (e.g., ?????), for example, enter the triplet "Alcohol abuse, causes, ?????" In another example, the user may select the relation term from a preset list of relation terms, for example, by clicking on the selected term. The first or second term may be manually entered, or also selected from a list.

Optionally, the value of the relation term may be selected from a preset list of values. The list may be expanded, for example, by a user and/or automatically by code. Exemplary values for the relation term include: caused by, causes, is part of, alternative to, is used by, is using, deficiency of, positively effects, influences, desired property for, distinguishing property, generalization, happens during, has acquired, has deficiency, has desired property, has expert, has market size, has producer, has properties, has quotes, human intelligence solution, and increased by.

Optionally, the query is defined as multiple nested triplets. The variable element of a lower level nested triplet is mapped to an element of a higher level triplet. The higher level triplet includes the mapped element, an element with defined value, and a variable element with undefined value. The query may be written with the lower level nested triplet in place of the mapped element of the higher level triplet. For example, the lower level nested triplet is ("dry eyes", "causes", lower level variable element). The higher level triplet is (mapped lower level variable element, "solution", higher variable element). For example, searching the lower level nested triplet may output the value "tear production" (i.e., dry eyes, causes, tear production). The value tear production is fed into the higher level triplet and searched, to yield the value "magnesium" (i.e., tear production, solution, magnesium).

Alternatively, the nested triplet is iteratively entered, by selecting from the results of execution of a first query to create a second query.

The nested triplet search for a sequence of relationships between concepts, to arrive at results which may not be achievable using a single triplet. For example, searching for ("dry eyes", "solution", variable element) may provide a solution to the dry eyes themselves, when the problem is actually tear production, and therefore may not be helpful to the user without the intermediate results that the magnesium is a solution to tear production caused by dry eyes. Using magnesium to treat dry eyes is not necessarily helpful, since magnesium is a solution to tear production due to dry eyes, and not a direct solution to dry eyes.

At 104, multiple enhanced queries are optionally created for the query. Each of the enhanced queries includes a variation of the relation term. When the relation term is the variable element, the enhanced queries are not necessarily created.

The enhanced queries may be obtained by selecting predefined query templates according to the relation term, for example, synonyms of the relation term. Alternatively or additionally, the query templates are automatically created by computing variations of the relation term, for example, by feeding the relation term into a synonym application that outputs synonym, and automatically creating the templates based on the outputted synonyms.

An exemplary set of templates for the relation term "affects", where [term] is the first token, and [effect] is the second token, include: [term] may cause [effect], [term] caused [effect], [term] causes [effect], [effect] amid [term], [term] which causes [effect], [effect] due to [term], [effect] will bring major [term], [effect] damaged by [term], [effect] means less [term].

An exemplary set of templates for the relation term "is contained", where [term] is the provided token, include: [term] found in [contained in], [term] in [contained in], [contained in] consists of [term], [contained in] contains [term], [contained in] ingredients include [term], [term] detected in [contained in].

At 106, providing the enhanced queries are provided for search by a search engine on one or more datasets of unstructured text-based data. For example, an internet search engine that searches online documents, such as news articles, blogs, and research articles. The search engine may be designed to search a certain dataset, for example, a search engine that searches a dataset of research publications.

The search engine may be a generic publicly accessible search engine that searches publicly available data (e.g., GOOGLE™, BING™ that search the internet), and/or a search engine that searches over a private and/or custom collection of documents (e.g., internal search engine that searches documents of a company, such as presentations, marketing material, accounting reports, and internal audits). The search engine may be a unification of querying several underlying engines.

At 108, one or more documents are received in response to the search of the enhanced queries (or the single query in the case where the relation term is not provided in the query).

At 110, the retrieved document(s) are analyzed for extracting value(s) for the variable element of the triplet.

Multiple candidate values for the variable element may be obtained. Optionally, each extracted candidate value is associated with a confidence score. The confidence score may be computed, for example, as indicative of correlation to the query, according to a number of documents from which the respective value is extracted (i.e., higher scores for triplets that are found in a larger number of different documents), and/or according to an indication of reliability of the documents from which the respective value is extracted (e.g., values extracted from peer reviewed research journals are assigned higher scores than values extracted from online blogs).

Values for the variable element having confidence score above a threshold (and/or other requirement such as select the top 10 values) may be retrained and/or values below the threshold (and/or other requirement) may be ignored. The threshold may be, for example, preset as a default value, selected by the user, and/or automatically set by code based on a requirement.

The process of extraction of the values may be predefined per relation term and/or based on the query.

One or more exemplary processes for extraction of the values from the retrieved documents are now described:

In one exemplary process, triplets are found in the text document, and are compared to the query to identify the variable element. The triplets found in the text have values for all three elements of the triplet. The values of the three elements are compared (e.g., matched) to the two provided elements values of the query, to identify the remaining missing element of the triplet (i.e., the variable element, the unmatched element). The variable element is according to the identified remaining missing element of the triplet.

In another exemplary process, each text segment of the documents is parsed into a respective dependency tree. Each text segment may be, for example, a phrase, a sentence, multiple sentences, a paragraph, a page of text, a chapter, and/or the entire text. A predefined pattern is identified within the respective dependency tree indicative of a triplet. The predefined pattern may be based on the relation term of the query, and/or may be based on the structure of the enhanced queries, for example, the sub-graph (<term>-"causes"-<noun phrase>). The triplet is compared to the query to identify the value for the variable element.

In yet another exemplary process, triplet(s) found in documents are outputted by a trained classifier that is fed the documents. The classifier may be implemented as, for example, as one or more neural networks of various architectures (e.g., artificial, deep, convolutional, fully connected, long short-term memory (LS™)), support vector machine (SVM), logistic regression, k-nearest neighbor, decision trees, and combinations of the aforementioned. The classifier is trained on a training dataset of training documents labeled with triplets. The classifier may assign scores to each identified candidate relation terms, and output triplets with scores above a threshold. The scores may be indicative of confidence of the outputted triplet.

In yet another exemplary process, the documents are analyzed for extracting the value for the variable element of the query by a question answering model, for example, trained on Squad. The documents may be analyzed one at a time (e.g., in parallel and/or sequentially). The one by one extraction facilitates decoupling between the extraction of values from candidate documents and the aggregation of results across multiple documents. The question answering model is a process designed to receive the document(s) and to receive a question created by a semantic analysis of the query, for example, when the query includes the token "bromine compound" and the relation term "used for" the question created is "What is bromine compound used for?". The question answering model outputs an indication of the value(s) for the variable elements within the document(s) as an answer to the question. For example, by marking the answer, and/or extracting the text portion of the document(s) corresponding to the answer.

At 112, the extracted values may be aggregated into a set of one or more values for the variable element.

The aggregation may be performed by clustering similar extracted values. Each cluster is created for one value of the set of candidate extracted values.

Optionally, an aggregated score is computed for each extracted value. The aggregated score may be computed as a unified score based on the different confidence scores computed for the different instances of the same value, for example, an aggregate score is computed for each cluster according to the confidence scores of the members of the cluster.

Optionally, the aggregated score is computed by an aggregation function that assigns higher scores to values with more documents and/or with higher confidence scores. The function computes the additive inverse of the product of the additive inverses of scores. For example, $$1-\Pi_i(1-S_i)$$

When Si are the confidence scores of each extraction, the Formula above is an optional aggregation. When from each document from which a triplet is extracted, a score denoted Si is received which indicates the probability of that triplet being correct (based on for example confidence in extraction reputability of the source) then with the assumption of independence the above formula indicates the probability of the triplet being correct given all of the documents it was extracted from.

The above formula has several desired properties, which hold even when the assumed Independence does not hold, increasing the confidence from a single document increases the overall confidence, and many weakly confident extractions may result in a high overall confidence. It is noted that other possible aggregation techniques may be used which will give the desired properties. It is noted that in the realistic world extraction scores are not entirely independent.

When the query is a nested query, and/or when the query is automatically expanded into multiple nested queries, the results of the extracted values for the nested queries may be aggregated.

At 114, the computed value(s) for the variable element are provided, optionally the aggregated results for the nested queries, for example, to the client terminal that provided the query. Optionally, the computed confidence score and/or aggregation score computed for each value of the variable element is provided. The different values for the variable element may be ranked according to the respective confidence score and/or aggregation score.

Optionally, the values for the variable element that are provided are those that meet a requirement. The requirement may be, for example, have a confidence score above a threshold, and/or return the top predefined number of variable element values ranked based on confidence score (e.g., highest 5, or 10, or other values).

The computed value(s) for the variable element may be presented on the display of the client terminal, optionally within a GUI, as described herein. The computed value(s) for the variable element may be fed back to a querying process, for example, via the API, SDK, and/or other interface.

Optionally, a link to the analyzed document(s) from which the respective value is extracted is provided. The link to the analyzed document may be presented, for example, within the GUI. The user may access the analyzed document by clicking on the link.

Optionally, the computed values are presented within a GUI presented on the display of the client terminal, as a dependency tree representation of the triplet including the computed value(s) for the variable element.

For example, consider the case where the query included a value for a first token and a value for the relation term, where the second token is the variable element. The first token is represented as a node of the graph and a root of the tree. Multiple second tokens, which are obtained from the analyzed documents as described herein, are represented as nodes of the graph and leaves of the tree. Multiple variations of relation term, which are based on the searched enhanced queries, are represented as edges connecting nodes and branches connecting the root to the leaves.

At 116, one or more features described with reference to 102-114 may be iterated, to create a nested query (also referred to herein as second query, or higher level query), or to execute another query.

Nested queries may be iterated multiple times. For example, a lower level first token of the query is used in a chain of mapping, where second tokens found by searching the first token and the respective relation term are each mapped into a higher level first token corresponding to a higher level respective relation term, which provides a higher level set of second tokens. Each of the higher level set of second tokens may be mapped into yet a further higher level first token corresponding to yet a higher level respective relation term, which provides a yet higher level set of second token.

In an example, the nested query first tokens→instanceOf→containedIn>usedFor, may provide an indication of potential novel applications for which the first token may be used for. For example, setting the first token as the term fuel engine, the relation term instanceOf is used to provide different types of fuel engines. The mapped relation term containedIn provides devices that use each of the different fuel engines, and the mapped relation term usedFor provides the places in which the different devices are applied. From the final output, it may be possible to estimate the industries that are affected by a change in the fuel price and perhaps also the magnitude of that change. In another example, the nested query is first token→deficiencyOf→possibleSolution. When the first token is set as Lithium Batteries a search is performed to look for known deficiencies of lithium batteries and then look for potential solutions.

The nested triplets may be recursively processed. A higher level query is created by setting the mapped element of the higher level triplet (e.g., the higher level first token) according to a selected value of the lower level triplet, i.e., the most recently executed query. For example, the user selects one of the results of values of the second token of the most recently processed triplet as a higher level first token, for example, by clicking on the node corresponding to the second token presented as a dependency tree in the GUI. A user may select another relation term (or use the same relation term most recently used) as the higher relation term for the higher level query. The higher level token (e.g., higher level first token) and the higher level relation are set as the higher level query, for executing of 102-114 using the higher level query to obtain one or more values for the higher level second token.

Optionally, the enhanced queries created for the higher level triplet are enriched with context related data extracted according to an analysis of the documents received in response to a search of the enhanced queries generated for the lower level triplet. For example, when the first level triplet is "dry eyes causes [second lower level token]", and the second level triplet is "[mapped element] causes [second higher level token] the context of the documents obtained for the first level triplet may be used to obtain the documents for the second level triplet, for example, documents in the context of dry eyes are obtained for the second level triplet. The context related data helps keep the results for the second level triplet within the context of the first level triplet. In another example, a nested query generated for the subsequent higher level relation terms may contain as context hints from the lower level relation terms. For example, when the query is to search looking for solutions for known deficiencies of batteries, the term explosions may be found as an intermediate result, however possible solution for explosions may be much less relevant than solutions for explosions of batteries. As such, the term battery may be included in a higher level query that includes the term explosions as context.

Optionally, for nested queries, the outputs of the lower level query may be scored as described herein. The higher scoring lower level results may be recursively used as the input set for the next higher level relation term query. For example, the top predefined number of highest scoring results are used, and/or results having scores above a threshold are used. The next higher level query search may search for co-occurrence of the previous lower term as well, for example when the query is first token→used for yielded pool sanitation and the next higher level relation is consumed by, instances that fit the relation consumed by but also include first token may be selected.

Optionally, a score assigned to the evidence may be used to validate the whole nested query, for example, for selecting which results of nested queries to present, and/or how to rank the results. The scores according to evidence for the intermediate results of the nested query may be aggregated, for example, summed and/or multiplied, to arrive at a single evidence score. Results having aggregated scores that are highest may denote high quality evidence used throughout the intermediate results of the nested query.

In the case of the nested query, the GUI is updated to present the mapping between the lower level triplet and the upper level triplet as additional edges between nodes of the tree. The variable element for which values were found (of the lower level nested triplet) is depicted as being mapped to an element of the higher level triplet as an intermediate node of the graph.

Figure 3:
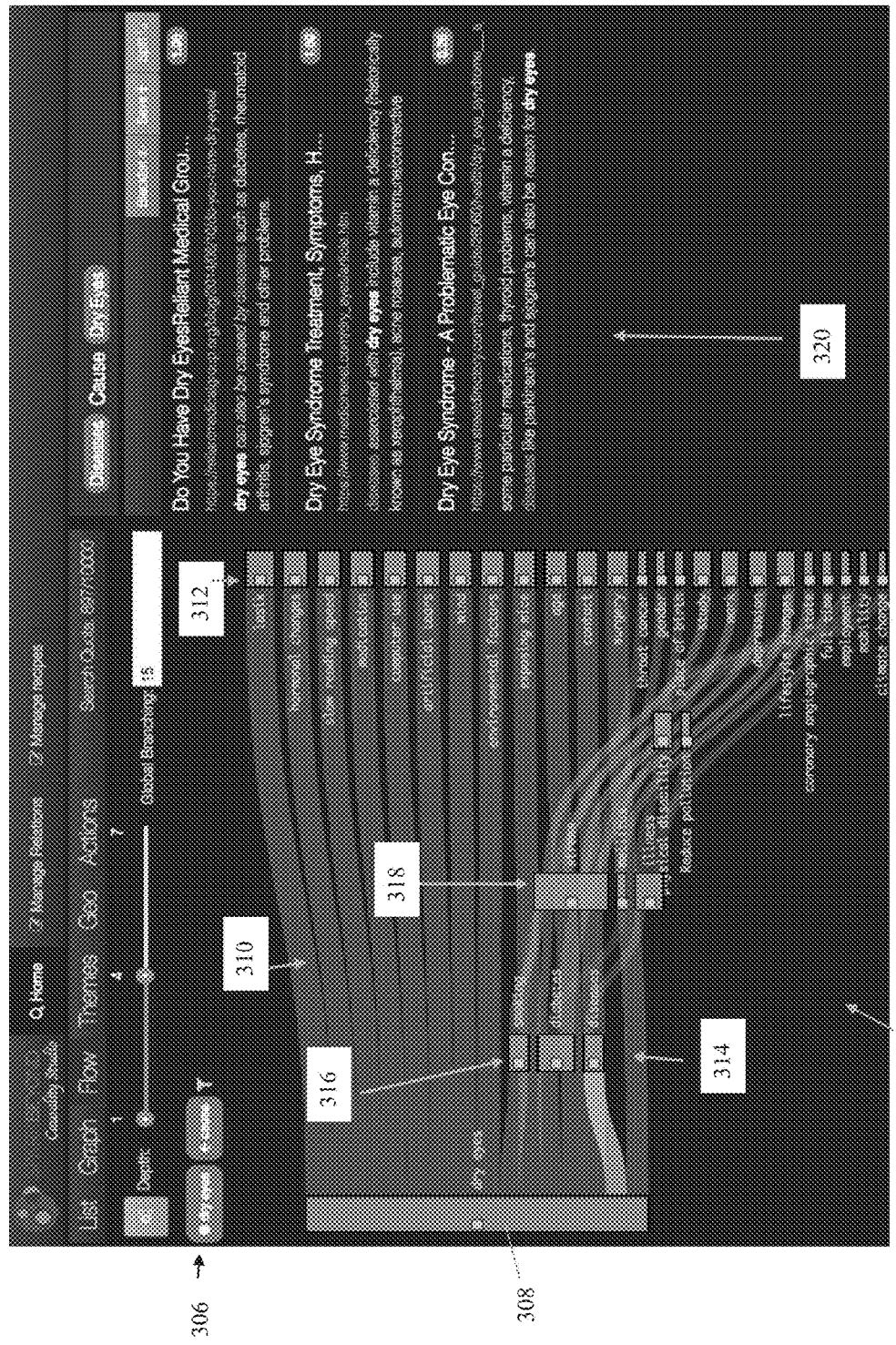
FIG. 3 is example of a GUI presenting a nested tree structure depicting a set of result for nested triplets with a lower level triplet of "[first token] causes dry eyes" (i.e., relation term is "causes" and second token is "dry eyes", in accordance with some embodiments of the present invention.

Reference is now made to FIG. 3, which is an example of a GUI 302 presenting a nested tree structure 304 depicting a set of result for nested triplets with a lower level triplet of "[first token] causes dry eyes" 306 (i.e., relation term is "causes" and second token is "dry eyes", in accordance with some embodiments of the present invention. Lower level results are shown with dry eyes 308 as a root node, connected by edges 310 representing the relation term "causes" and multiple values for the first token 312 obtained from the search results, as described herein, for example, lasik, hormonal changes, slow reading speed, medication, computer use, artificial tears, wind, environmental factors, exposing mice, age, contact, surgery. It is noted that the results of the first token are shown on the right, and the second token is shown on the left. Smoking, diabetes, and diseases 314 are results for the first token which are selected (e.g., by clicking) for creation of a nested query (i.e., higher level query), optionally multiple nested triplets. For example, smoking 316 is set as the second token, the same relation term "causes" is used, and multiple higher level values for the higher level first token are obtained, for example, stress and throat cancer. In yet another higher level query, stress 318, which is a result of a value for the first token for the higher level query, is used to create another nested query, by setting smoking at the second level query, and using the same relation term "causes", to obtain multiple values for the first token of the highest level query, for example, study, work, depression, and lifestyle changes. In this manner, iterative relationships are mapped by the nested tree 304 presented in GUI 302, for example, study causes stress which causes smoking which causes dry eyes. A window 320 may present a summary of the documents used to extract the resulting values, and/or links to the document(s).

Figure 4:
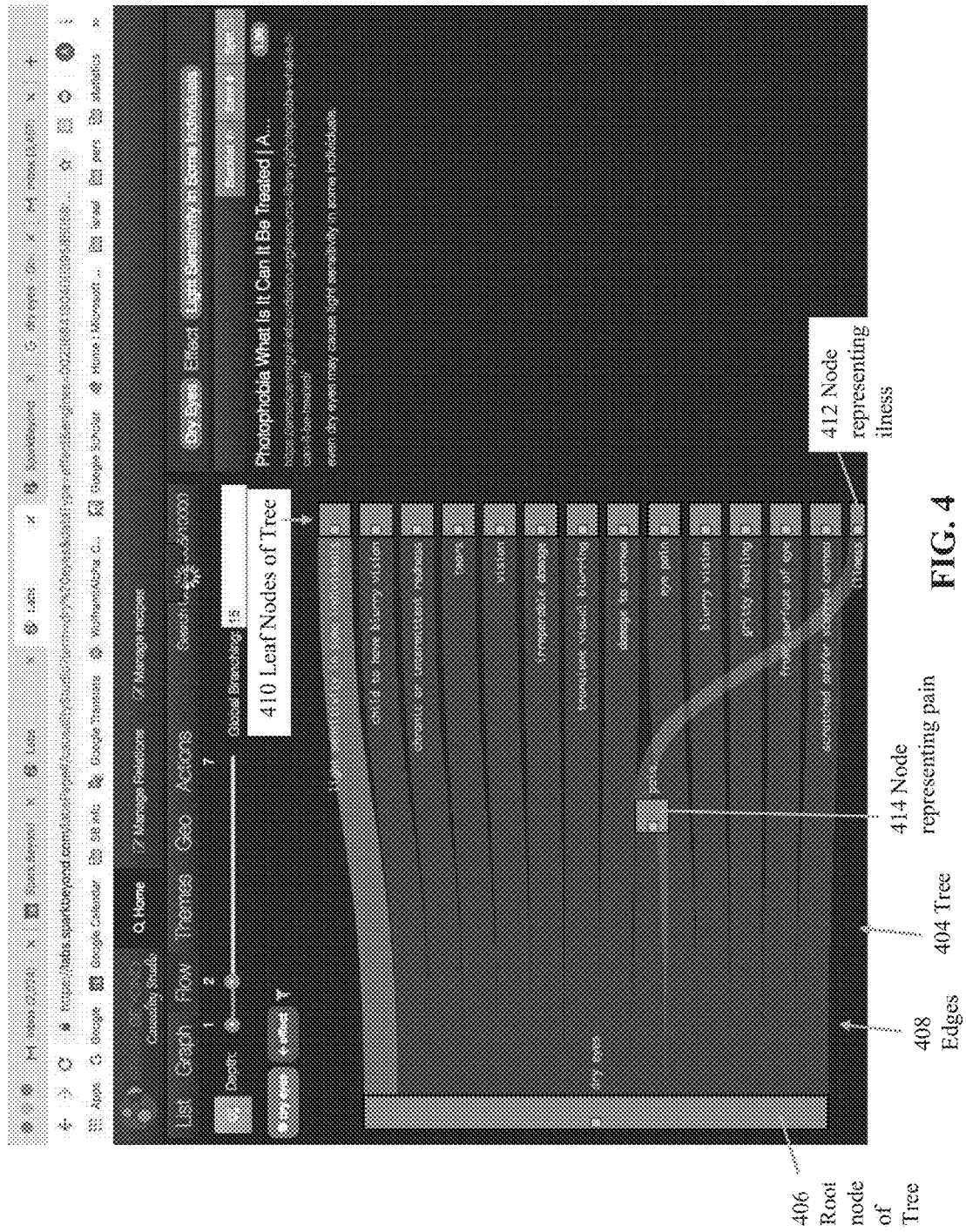
FIG. 4 is an example of a GUI presenting a tree structure depicting a set of results for the nested triplet of "[first token] is an effect of dry eyes" (i.e., relation term is "is an effect of" and second token is "dry eyes"), which is a reverse of the triplet discussed presented with reference to FIG. 3, in accordance with some embodiments of the present invention.

Reference is now made to FIG. 4, which is an example of a GUI 402 presenting a tree structure 404 depicting a set of results for the nested triplet of "[first token] is an effect of dry eyes" (i.e., relation term is "is an effect of" and second token is "dry eyes"), which is a reverse of the triplet discussed presented with reference to FIG. 3, in accordance with some embodiments of the present invention. Dry eyes is presented as a root node 406 of tree 404, connected by edges 408 denoting the relation term to multiple leaf nodes 410 denoting results of the search, i.e., which are an effect of dry eyes, for example, light sensitivity in some individuals, child to have blurry vision, chronic or intermittent redness, tears, vision, irreparable damage, transient visual blurring, damage to cornea, eye pain, blurry vision, gritty feeling, front surface of eye, and scratched and/or scarred cornea. It is noted that the mapping of illness 412 is an effect of pain 414 which is an effect of dry eyes 406 depicts a nested query, as described herein.

Figure 5:
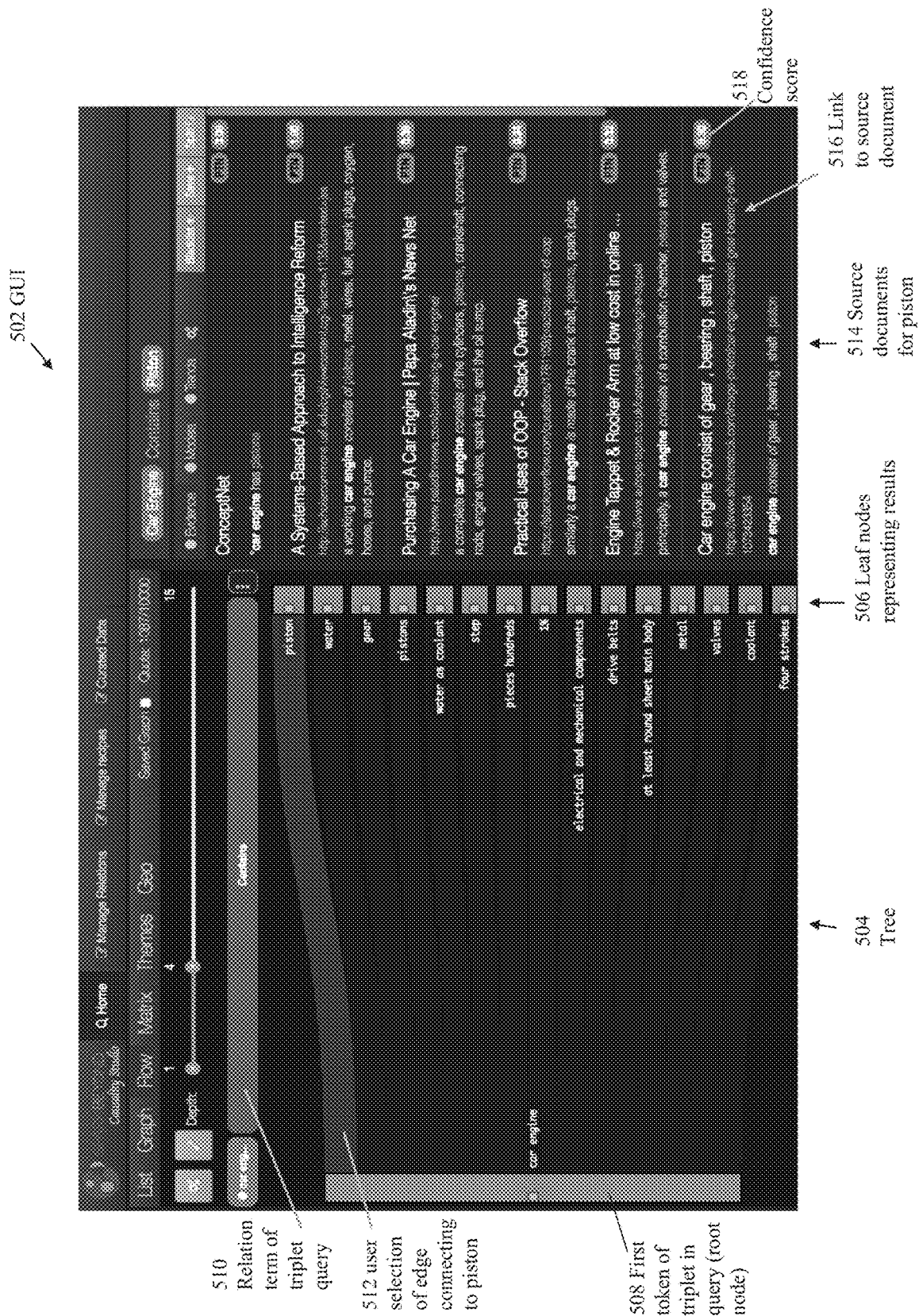
FIG. 5 is example of a GUI presenting a tree structure depicting a set of results for a triplet of a query that included a first token have a value of "car engine", and a relation term "contains", in accordance with some embodiments of the present invention.

Reference is now made to FIG. 5, which is an example of a GUI 502 presenting a tree structure 504 depicting a set of results 506 for a triplet of a query that included a first token have a value of "car engine" 508, and a relation term "contains" 510, in accordance with some embodiments of the present invention. Car engine 508 is shown as a root node, connected to leaf nodes each denoting one of the results 506 via edges denoting "contains" 510.

Optionally, results 506 are ranked according to confidence scores and/or aggregated scores.

Optionally, a user may select one of the results, for example, by clicking. For example, as shown, the user selects the result piston by clicking on edge 512 connecting car engine 508 and piston. Optionally, in response to the selection of piston, GUI 502 is updated with a list of the source documents from which the term piston has been extracted, for example, presented in a window 514. A link 516 (e.g., URL, other network address) may be presented in association with each source document. A confidence score 518 computed for each source document may be presented.

Figure 6:
FIG. 6 is an example of a GUI presenting a tree structure depicting a set of results for a nested query, in accordance with some embodiments of the present invention.

Reference is now made to FIG. 6, which is an example of a GUI 602 presenting a tree structure 604 depicting a set of results for a nested query, in accordance with some embodiments of the present invention. The lower level triplet included a first token of "dry eyes", depicted as a node 606 of the tree 604. The relation term of the lower level query (i.e., triplet) is "causes", depicted as edges 608 of the tree 604. The outputted results for the second token of the lower level query (i.e., triplet) are depicted as nodes 610 each connected to a respective edge 608. Each one of the values computed for the second token of the lower level query 610 is fed as a first token of the higher level query (i.e., triplet). The higher level query (i.e., triplet) is created from each respective value for the first token of the lower level query, and a relation term "solution", depicted by respective edges 612. A set of results to the second token of the higher level query is depicted as leaf nodes 614 connected to respective edges 612. For example, dry eyes causes tear production, a solution to the tear production is magnesium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant search engines will be developed and the scope of the term search engine is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for searching unstructured data stored on a plurality of network connected nodes with a query fed into a network search engine, comprising:
  receiving, from a user via a user interface, a query comprising a value and a relation term;
  in response to the query:
    placing the query into a triple data structure format, wherein a first token of the triplet is set to the value of the query, the relation term of the query defining a relationship between the first token and a second token of the triplet, wherein the second token is defined as a variable element set with an undefined value;
    creating a plurality of enhanced queries for the triplet data structure format of the query provided by the user, each one of the plurality of enhanced queries including variations of the relation term;
    searching over a network by the network search engine fed the plurality of enhanced queries, on unstructured text-based network document sources hosted by the plurality of network connected nodes;

receiving a plurality of network documents of unstructured text in response to the search over unstructured text based on the triplet data structure format of the query provided by the user;

analyzing the plurality of network documents of unstructured text received from the search engine for extracting a plurality of values for the variable element of the triplet data structure of the query provided by the user;

aggregating the plurality of values extracted from results of the search over unstructured text based on the triplet data structure format of the query provided by the user, into a set of aggregated values for the variable element of the triplet data structure format of the query provided by the user, wherein the plurality of values are aggregated by clustering similar values extracted from the search over unstructured text, each cluster denoting one value of the set of values;

creating at least one complete triplet data structure for the triplet data structure format of the query provided by the user, by substituting each one of the set of aggregated values for the variable element of the triplet data structure created from the query of the user; and providing the at least one complete triple data structure for presentation on a display of a client terminal as a result of the search for the query entered by the user.

2. The method of claim 1, wherein the query comprise a plurality of nested triplets, wherein the variable element with undefined value of a lower level nested triplet is mapped to an element of a higher level triplet, the higher level triplet including the mapped element, and a higher level relation term defining a relationship between the mapped element and a higher level second token defined as a higher level variable element with undefined value.

3. The method of claim 2, wherein the nested triplets are recursively processed, by creating a higher level query by setting the mapped element of the higher level triplet according to the at least one value for the lower level triplet, and setting the relation term of the higher level query according to the higher level relation term, and wherein the creating the plurality of enhanced queries, the providing the plurality of enhanced queries, the receiving the plurality of documents, and the analyzing the plurality of documents to extract at least one value are performed for the higher level query.

4. The method of claim 3, wherein the plurality of enhanced queries for the higher level triplet are enriched with context related data extracted according to an analysis of the plurality of documents received in response to a search of the plurality of enhanced queries generated for the lower level triplet.

5. The method of claim 1, wherein the plurality of enhanced queries are generated for the query by selecting a plurality of query templates according to the relation, wherein respective relations of the selected query templates are synonyms of the relation of the query.

6. The method of claim 1, wherein analyzing the plurality of documents for extracting at least one value for the variable element of the triplet comprises: identifying at least one triplet having three elements in the plurality of documents, and comparing values of three elements of the extracted at least one triplet to the values of the two elements of the query to identify a remaining element, wherein the at least one value for the variable element of the query is set according to the remaining element.

7. The method of claim 6, wherein the at least one triplet of the plurality of documents is identified by parsing each text segment of the plurality of documents into a respective dependency tree, and identifying a predefined pattern within the respective dependency tree indicative of a triplet.

8. The method of claim 6, wherein the at least one triplet of the plurality of documents is outputted by a trained classifier that is fed the plurality of documents, wherein the classifier is trained on a training dataset of a plurality of training documents labeled with respective training triplets within each respective training document.

9. The method of claim 1, wherein the plurality of documents are analyzed for extracting at least one value for the variable element of the query by a question answering model that receives each of the plurality of documents and a question created by a semantic analysis of the query and outputs an indication of the at least one value for the variable elements within the plurality of documents as an answer to the question.

10. The method of claim 1, where each respective value of the set of values is assigned a score according to at least one of:
a number of documents from which the respective value is extracted, and
according to an indication of reliability of the documents from which the respective value is extracted, wherein values of the set of values having scores above a threshold are provided.

11. The method of claim 1, wherein the extracted at least one value for the variable element is associated with a confidence score indicative of correlation to the query, and values for the variable element having confidence score above a threshold are provided.

12. The method of claim 1, further comprising providing, for each respective value for the variable element, a link to the analyzed document used to provide the respective value.

13. The method of claim 1, further comprising: presenting, within a graphical user interface (GUI), a dependency tree graph representation of the triplet with the at least one value for the variable element, wherein the first token is represented as a node of the graph and a root of the tree, wherein a plurality of second tokens are represented as nodes of the graph and leaves of the tree, wherein a plurality of the relation term based on the plurality of enhanced queries are represented as edges connecting nodes and branches connecting the root to the leaves.

14. The method of claim 13, further comprising receiving via the GUI a selection of one of the plurality of second tokens and another relation term, creating another query by designating the selected one of the plurality of second tokens as the first token of the another query and designating the another relation term as the relation term of the another query, and presenting within the GUI a plurality of values for the plurality of second tokens as additional nodes of the graph, and representing the plurality of the another relation term as edges connecting the additional nodes to the node of the selected one of the plurality of second tokens.

15. The method of claim 1, wherein each of the plurality of enhanced queries is a template, and the plurality of templates are provided for search by the network search engine.

16. The method of claim 1, wherein the network documents hosted by the plurality of network connected nodes comprise web pages stores on web sites of web servers on the internet, and the network search engine comprises an internet search engine.

17. A system for searching unstructured data stored on a plurality of network connected nodes with a query fed into a network search engine, comprising:
- at least one hardware processor; and
- a non-transitory computer readable storage medium containing computer-executable instructions that, when executed by the at least one hardware processor cause the system to perform the steps of:
    - receiving, from a use via a user interface, a query comprising a value and a relation term;
    - in response to the query:
        - placing the query into a triple data structure format, wherein a first token of the triplet is set to the value of the query, the relation term of the query defining a relationship between the first token and a second token of the triplet, wherein the second token is defined as a variable element set with an undefined value;
        - creating a plurality of enhanced queries for the triplet data structure format of the query provided by the user, each one of the plurality of enhanced queries including variations of the relation term;
        - searching over a network by the network search engine fed the plurality of enhanced queries, on unstructured text-based network document sources hosted by the plurality of network connected nodes;
        - receiving a plurality of network documents of unstructured text in response to the search over unstructured text based on the triple data structure format of the query provided by the user;
        - analyzing the plurality of network documents of unstructured text received from the search engine for extracting a plurality of values for the variable element of the triplet data structure of the query provided by the user;
        - aggregating the plurality of values extracted from results of the search over unstructured text based on the triplet data structure format of the query provided by the user, into a set of aggregated values for the variable element of the triplet data structure format of the query provided by the user, wherein the plurality of values are aggregated by clustering similar values extracted from the search over unstructured text, each cluster denoting one value of the set of values;
        - creating at least one complete triplet data structure for the triplet data structure format of the query provided by the user, by substituting each one of the set of aggregated values for the variable element of the triplet data structure created from the query of the user; and
        - providing the at least one complete triple data structure for presentation on a display of a client terminal as a result of the search for the query entered by the user.

18. A method for searching unstructured data stored in a plurality of network connected nodes with a query fed into a network search engine, comprising:
- receiving, from a use via a user interface, a query comprising a first value and a second value;
- in response to the query:
    - placing the query into a triple data structure format, wherein a first token of the triplet is set to the first value of the query, and a second token of the triplet is se to the second value of the query, the triplet further including a relation term defining a relationship between the first token and the second token, wherein the relation term is defined as a variable element set with an undefined value;
    - searching by the network search engine fed the plurality of enhanced queries, on unstructured text-based network document sources hosted by the plurality of network connected nodes;
    - receiving a plurality of network documents of unstructured text in response to the search over unstructured text based on the triplet data structure format of the query provided by the user;
    - analyzing the plurality of network documents of unstructured text received from the search engine for extracting a plurality of values for the variable element of the triplet data structure of the query provided by the user;
    - aggregating the plurality of values extracted from results of the search over unstructured text based on the triplet data structure format of the query provided by the user, into a set of aggregated values for the variable element of the triplet data structure format of the query provided by the user, wherein the plurality of values are aggregated by clustering similar values extracted from the search over unstructured text, each cluster denoting one value of the set of values;
    - creating at least one complete triplet data structure for the triplet data structure format of the query provided by the user, by substituting each one of the set of aggregated values for the variable element of the triplet data structure created from the query of the user; and
    - providing the at least one complete triple data structure for presentation on a display of a client terminal as a result of the search for the query entered by the user.

* * * * *